US006521730B1

(12) United States Patent
Pabon et al.

(10) Patent No.: US 6,521,730 B1
(45) Date of Patent: Feb. 18, 2003

(54) FLUORINATED HYDROPHILIC POLYMERS

(75) Inventors: Martial Pabon, Courbevoie (FR); Elisabeth Morillon, Courbevoie (FR); Jean-Marc Corpart, Sannois (FR)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/701,788

(22) PCT Filed: May 31, 1999

(86) PCT No.: PCT/FR99/01236

§ 371 (c)(1),
(2), (4) Date: Jan. 23, 2001

(87) PCT Pub. No.: WO99/62972

PCT Pub. Date: Dec. 9, 1999

(30) Foreign Application Priority Data

Jun. 3, 1998 (FR) ............................................. 98 06941

(51) Int. Cl.$^7$ ............................................. C08F 118/00
(52) U.S. Cl. .................... 526/245; 526/243; 526/250; 526/255; 526/264; 526/287; 526/288; 526/303.1; 526/304; 526/307.6; 526/307.7; 526/318.4; 526/320
(58) Field of Search ................................ 526/243, 245, 526/250, 255, 264, 303.1, 304, 307.6, 287, 307.7, 288, 318.4, 320

(56) References Cited

U.S. PATENT DOCUMENTS

| | | | |
|---|---|---|---|
| 3,336,269 A | | 8/1967 | Monagle et al. |
| 4,127,711 A | * | 11/1978 | Lore et al. .................... 526/245 |
| 4,563,287 A | | 1/1986 | Hisamoto et al. |
| 4,606,832 A | | 8/1986 | Hisamoto et al. |
| 4,840,989 A | * | 6/1989 | Ohst et al. .................... 524/544 |
| 4,891,306 A | | 1/1990 | Yokoyama et al. |
| 5,496,475 A | * | 3/1996 | Jho et al. ........................ 252/2 |

FOREIGN PATENT DOCUMENTS

| | | | |
|---|---|---|---|
| DE | 1 952 585 | | 4/1970 |
| EP | 0 846 709 A1 | | 6/1998 |
| FR | 1 508 702 | | 1/1968 |
| FR | 2 438 484 | | 5/1980 |
| FR | 2785904 | * | 5/2000 |
| GB | 1 290 384 | | 10/1969 |
| GB | 1 328 742 | | 8/1973 |

OTHER PUBLICATIONS

International Search Report for PCT/FR99/01236 dated Aug. 11, 1999 (PCT/ISA/210).
Alain Hill, et al., "Properties of Hydrophobically Associating Polyacrylamides: Influence of the Method of Synthesis," Macromolecules (1993), 26, pp. 4521–4532.
Charles L. McCormick, et al., "Water–soluble copolymers: 27. Synthesis and aqueous solution behaviour of associative acrylamide/N–alkylacrylamide copolymers," Polymer (1988), vol. 29, Apr., pp. 731–739.

Kenneth C. Dowling, et al., "A Novel Micellar Synthesis and Photophysical Characterization of Water–Soluble Acrylamide–Styrene Block Copolymers," Macromolecules (1990), 23, pp. 1059–1064.
Y.X. Zhang, et al., "New Fluorocarbon–Containing Hydrophobically Associating Polyacrylamide Copolymer," ACS–Symp.Ser. (1991), pp. 159–174.
Y.X. Zhang, et al., "A Fluorocarbon–Containing Hydrophobically Associating Polymer," Journal of Polymer Science: Part C: Polymer Letters, vol. 28, pp. 213–218.
F.S. Hwang, et al., "Effects of Water–Soluble Spacers on the Hydrophobic Association of Fluorocarbon Modified Polyacrylamide," Polymer Preprints (1993), 34 (1), pp. 405–406.
T.E. Hogen–Esch, et al., "Synthesis and Characterization of Fluorocarbon Containing Polyacrylamides," Polymer Prepints (1990), 32(1), pp. 460–461.
Y.X. Zhang, et al., "A Fluorine–Containing Hydrophobically Associating Polymer. I. Synthesis and Solution Properties of Copolymers of Acrylamide and Fluorine–Containing Acrylates or Methacrylates," Journal of Polymer Science: Part A: Polymer Chemistry (1992), vol. 30, pp. 1383–1391.
Xiaoyi Xie, et al., "Copolymers of N,N–Dimethylacrylamide and 2–(N–ethylperfluorooctanesulfonamido) ethyl Acrylate in Aqueous Media and in Bulk. Synthesis and Properties," Macromolecules (1996), 29, pp. 1734–1745.
M. Yassini, et al., "Fluorine–containing hydrophobically associating water soluble polymer. Kinetic of polymerization by 19F NMR," Polymer Preprints (1994), 35 (1), pp. 478–479.
Y.X. Zhang, et al., "A New Flurocarbon–Containing Hydrophobically Associating Polyacrylamide Copolymer," Polymer Preprints (1989), 30 (2), pp. 338–339.
F.A. Abdel–Mohdy, et al., "Reactive Perfluoroheptyl Methacrylate–Acrylamide Copolymers Synthesis and Application," Pigment & Resin Technology (1994), 23(2), pp. 10–14.
Jean–Marie Bessiere, et al., "Determination of kinetic parameters for isothermal decomposition of azo initiators of polymerization by differential scanning calorimetry," Polymer Bulletin (1993), 30, pp. 545–549.
Hideo Sawada, et al., "Reactions of acrylic acid with fluoroalkanoyl peroxides—the formation of acrylic acid oligomers containing two fluoroalkylated end–groups," Journal of Fluorine Chemistry, 65 (1993), pp. 169–173.
Hideo Sawada, "Fluorinated Organic Peroxides—Their Decompositions Behavior and Applications," Reviews on Heteroatom Chemistry (1993), 8, pp. 205–231.

* cited by examiner

*Primary Examiner*—Helen L. Pezzuto

(57) ABSTRACT

1) Hydrophilic fluoropolymers obtained by radical polymerization, in a precipitating medium, of a mixture of monomers composed of at least one monomer with a perfluoroalkyl side chain, of one or more ionic or ionizable hydrophilic monomer(s) and optionally of one or more nonionic hydrophilic monomer(s).

2) Use of these polymers as dispersants or thickeners and as additives in multipurpose fire-fighting emulsifiers.

13 Claims, No Drawings

FLUORINATED HYDROPHILIC POLYMERS

FIELD OF THE INVENTION

The present invention relates to the field of hydrophilic polymers and has more particularly as subject-matter hydrophilic fluoropolymers obtained by radical polymerization in a precipitating medium. These polymers lower the surface tension of aqueous solutions; they are good foaming agents and they are more particularly advantageous as dispersants or thickeners and as additives in multipurpose fire-fighting emulsifiers.

BACKGROUND OF THE INVENTION

Hydrophilic polymers and more particularly those based on acrylamide, on methacrylamide or on their N-substituted derivatives are well known and widely used industrially. Acrylamide, methacrylamide and their derivatives are very often copolymerized with other hydrophilic monomers carrying anionic or cationic ionic or ionizable charges which confer, on the hydrophilic polymer, specific properties suited to each application. These polymers are commonly used in the paper industry, in water treatment or in metallurgy as flocculants for ores; they are also used as thickening agents in numerous formulations, such as textile printing and cosmetic products.

The most widely used methods for preparing these polymers involve aqueous media; such is the case of polymerization in aqueous solution or of micellar polymerization but other methods, such as inverse emulsion polymerization, are also practised. The polymerization is generally initiated by a radical-generating redox couple, such as, for example, the persulphate $(S_2O_8^{2-})$/metabisulphite $(S_2O_5^{2-})$ couple, but also by azo or peroxide radical initiators. Other initiating systems can be used, such as UV rays, X rays, ultrasound or cobalt salts.

The copolymerization of acrylamide, of methacrylamide and of their derivatives in a precipitating medium, in which the monomers are soluble and the polymer precipitates during its formation, is a method which is more rarely used and which is disclosed in particular in Patents FR 1 508 702, GB 1 328 742 and U.S. Pat. No. 3,336,269.

Acrylamide, methacrylamide and their derivatives can also be copolymerized with water-insoluble monomers possessing a hydrocarbonaceous hydrophilic side chain, such as, for example, fatty alcohol acrylates or methacrylates. The copolymers thus formed are associative thickeners, the hydrophobic groups of which, in aqueous solution, tend to form intermolecular associations, thus creating a transitory network. In aqueous solution, the viscosity of these associative polymers depends on the shear rate; the solution generally exhibits a pseudoplastic nature, that is to say that its viscosity decreases with the increase in the shear rate. Such products are disclosed in references [1] to [3], the list of which appears after the examples of the present application.

Acrylamide, methacrylamide and their derivatives can also be copolymerized with monomers possessing a perfluoroalkyl hydrophobic side chain, such as, for example, fluoroalcohol acrylates or methacrylates. The synthesis and the characterization of such hydrophilic fluoropolymers are described by Thieo E. Hogen-Esch and his coworkers and by other authors in references [4] to [12]. These fluorocopolymers were prepared in aqueous medium in the presence of a cosolvent, such as acetone ([4]–[9]), and more rarely in aqueous medium in the absence of cosolvent [12] or under bulk conditions [9], the polymerization reaction having been initiated by a redox couple which is a precursor of radicals by oxidation/reduction ([4]–[9]), by a radical initiator which is a precursor of radicals by thermal decomposition ([9]–[12]) or by triphenylmethylcaesium in anionic polymerization in solution in tetrahydrofuran. U.S. Pat. No. 4,891,306 discloses hydrophilic fluorocopolymers obtained by anionic or cationic polymerization; these products are used in light-sensitive photographic materials.

In all the cases cited above, the hydrophilic fluorocopolymers are synthesized under bulk conditions or in aqueous medium in the presence of surfactants, the purpose of which is to dissolve the hydrophobic fluoromonomers inside the micelles. The surfactants preferably used are fluorosurfactants, the perfluoroalkyl side chain of which is compatible with fluoromonomers, which makes possible the dissolution of these monomers. The hydrophilic fluoropolymers obtained by polymerization in aqueous medium exhibit, as common characteristic, a high molecular weight, which leads to very viscous aqueous solutions, resulting in the use of such products as viscosifying agents. In many cases, the presence of fluorosurfactants interferes with the subsequent use of the polymers, which makes it necessary to resort to precipitation of the polymer from a large excess of solvent, followed by washing the polymer. This precipitating and washing stage, which is additional to the synthesis, has to be carried out with large amounts of solvents, such as, for example, alcohols, which increases the manufacturing cost and produces effluents laden with surfactants. In the case of the polymerization in a precipitating medium, used in the context of the present invention, it is much easier and faster to recover the polymer in the powder form. Although starting from monomers of the same nature as those described above, namely acrylamide or methacrylamide derivatives and monomers comprising a perfluoroalkyl side chain, the hydrophilic fluoropolymers forming the subject-matter of the present invention are distinguished from the above in several respects, the main ones of which are the preparation process proper, the content of fluoromonomers incorporated in the polymer and the nature of the radical-initiating agents. These differences are reflected by very different behaviours from the view point of the applicative properties.

The hydrophilic fluoropolymers according to the invention can, for example, be used as additives in multipurpose fire-fighting emulsifiers, that is to say emulsifiers intended for the extinguishing of hydrocarbon fires and polar liquid fires.

Fire-fighting emulsifiers comprising hydrophilic fluoropolymers have already been disclosed, in particular in Patents FR 2 438 484, U.S. Pat. Nos. 4,563,287 and 4,606,832.

Acrylamide, methacrylamide and their N-substituted derivatives, used in the context of the present invention, and the method for polymerization in a precipitating medium are not mentioned in U.S. Pat. No. 4,563,287, which, for the extinguishing of cooking oil fires, discloses nonfoaming compositions, whereas the emulsifiers comprising a hydrophilic fluoropolymer according to the present invention are foaming compositions.

The extinguishing compositions disclosed in U.S. Pat. No. 4,606,832, also intended for combating cooking oil fires, involved bromofluorohydrocarbons and/or bromochlorofluorohydrocarbons, which is not the case in the present invention, and are not fire-fighting emulsifiers having foaming properties, as in the case of the present invention.

Patent FR 2 438 484, which does not mention acrylamide, methacrylamide or their N-substituted derivatives, indicates that the polymers can be obtained by solution polymerization. In point of fact, solution polymerization, applied to the hydrophilic fluoropolymers according to the invention, does not result in successful products; it is necessary to resort to polymerization in a precipitating medium.

SUMMARY OF INVENTION

A subject-matter of the present invention is therefore hydrophilic fluoropolymers obtained by radical polymerization, in a precipitating medium, of a mixture of monomers composed, by weight, of:
- (a) 0 to 49% of at least one nonionic hydrophilic monomer, preferably 25 to 45%, more preferably still 35 to 45%;
- (b) 20 to 75% of at least one monomer comprising a perfluoroalkyl radical, preferably 25 to 60%, more preferably still 25 to 50%; and
- (c) 5 to 75% of one or more ionic or ionizable hydrophilic monomers, preferably 5 to 35%, more preferably still 5 to 20%.

These polymers have foaming properties; they lower the surface tension of aqueous solutions and are particularly advantageous as additives in multipurpose fire-fighting emulsifiers, that is to say emulsifiers intended for combating hydrocarbon fires and polar liquid fires. They are advantageous in particular in preventing the resurgence of the fire, in the case of combating polar liquid fires.

A fourth monomer can also be used. It can in particular be a monomer which acts as crosslinking agent, for example during the application of the polymer to the fire to be combated.

The method used to prepare these hydrophilic fluoropolymers is polymerization in a precipitating medium; it exhibits the advantage of generating polymers of low molecular weight and therefore products of low viscosity, of making use of a single solvent, which can easily be regenerated and reused, and of not requiring the use of surfactants which might interfere with the application and which it would therefore be necessary to extract from the medium. The solvent used for this polymerization in a precipitating medium can be distilled off and then replaced with water or a water/cosolvent mixture. The final product is then provided in the form of an aqueous dispersion of the polymer. Depending on the operating conditions, such as the relative contents of the various monomers, the concentration of radical initiator, the total initial concentration of monomers and the polymerization temperature, it is possible to obtain a complete range of polymers according to the invention which differ in their molecular weight, their fluorine content and their level of anionic and/or cationic charges.

Mention may be made, as nonlimiting examples of non-ionic hydrophilic monomers (a), of:

N-vinyl-2-pyrrolidone and its derivatives, such as N-vinyl-3-methyl-2-pyrrolidone, N-vinyl-4-methyl-2-pyrrolidone, N-vinyl-5-methyl-2-pyrrolidone or N-vinyl-3,3-dimethyl-2-pyrrolidone;

ethylene glycol acrylate or methacrylate;

polyethylene glycol or polyethylene glycol ether acrylates or methacrylates corresponding to the general formula:

$$CH_2=CR^1-CO(OCH_2CH_2)_k-OR \quad (I)$$

in which R represents a hydrogen atom or a methyl or ethyl radical, k is an integer ranging from 1 to 50 and $R^1$ represents a hydrogen atom or a methyl radical;

acrylamide, methacrylamide and their N-substituted derivatives corresponding to the following general formula:

$$CH_2=CR^1-CONR^2R^3 \quad (II)$$

in which $R^1$ has the same meaning as above and the $R^2$ and $R^3$ symbols, which are identical or different, each represent a hydrogen atom or an alkyl or hydroxyalkyl radical comprising from 1 to 3 carbon atoms.

Mention may be made, as nonlimiting examples of hydrophilic monomers of formula (II), of acrylamide, N-methylacrylamide, N-ethylacrylamide, N,N-dimethylacrylamide, N-methyl-N-ethylacrylamide, N-(hydroxymethyl)acrylamide, N-(3-hydroxypropyl)acrylamide, N-(2-hydroxyethyl)acrylamide, methacrylamide, N-methylmethacrylamide, N-ethylmethacrylamide, N,N-dimethylmethacrylamide, N-(hydroxymethyl)methacrylamide, N-(3-hydroxypropyl)methacrylamide and N-(2-hydroxyethyl)methacrylamide.

Acrylamide, methacrylamide and their N-substituted derivatives described above will preferably be chosen and more particularly acrylamide and methacrylamide.

The fluoromonomers (b) are monomers comprising a linear or branched perfluoroalkyl radical comprising from 2 to 20 carbon atoms. The choice is preferably made of acrylates or methacrylates of fluoroalcohols corresponding to the following general formula:

(III)

$$CH_2=CR^4$$
$$|$$
$$COO-B-R_f$$

in which $R_f$ represents a linear or branched perfluoroalkyl radical comprising from 2 to 20, preferably from 4 to 16, carbon atoms, $R^4$ represents a hydrogen atom or a methyl radical and B represents a divalent linkage bonded to O via a carbon atom which can comprise one or more oxygen, sulphur and/or nitrogen atoms. Mention may be made, without implied limitation, of acrylates or methacrylates of the fluoroalcohols corresponding to the following formulae:

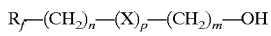

$$R_f-(CH_2)_n-(X)_p-(CH_2)_m-OH$$

$$R_f-(CH_2)_r-(OCH_2CH_2)_q-OH$$

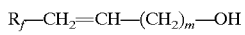

$$R_f-CH_2=CH-(CH_2)_m-OH$$

in which $R_f$ has the same meaning as in the formula (III), X represents an oxygen or sulphur atom or a —COO—, —OCO—, —CONR$^5$— or —SO$_2$NR$^5$— group, $R^5$ denoting a hydrogen atom or a methyl or ethyl radical, n represents an integer ranging from 0 to 20 (preferably equal to 0 or 2), p is equal to 0 or 1 and the m, q and r symbols, which are identical or different, each represent an integer ranging from 1 to 20 (preferably equal to 2 or 4), n not being zero if X is an oxygen or sulphur atom or an —OCO— group.

Use is preferably made of acrylates or methacrylates of the fluoroalcohols corresponding to the following formulae:

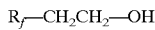

$$R_f-CH_2CH_2-OH$$

or

$$R_f-CH_2CH_2-SO_2NR^5-CH_2CH_2-OH$$

in which $R_f$ and $R^5$ have the same meanings as above.

Mention may be made, without implied limitation, as examples of ionic hydrophilic monomers (c) or hydrophilic monomers (c) which can be ionized by varying the pH which can be used in the context of the invention, of:
  acrylic acid, methacrylic acid and their alkali metal or quaternary ammonium ion salts;
  monoolefinic sulphonic acid derivatives and their alkali metal salts, such as, for example, sodium ethylenesulphonate, sodium styrenesulphonate and 2-acrylamido-2-methylpropanesulphonic acid;
  vinylpyridinium halides, such as, for example, 4-vinylpyridinium chloride;
  acrylates or methacrylates of the aminoalcohols corresponding to the following formulae:

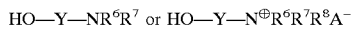

HO—Y—NR$^6$R$^7$ or HO—Y—N$^\oplus$R$^6$R$^7$R$^8$A$^-$ in which the R$^6$, R$^7$ and R$^8$ symbols, which are identical or different, each represent an alkyl or hydroxyalkyl radical comprising 1 to 4 carbon atoms, Y represents an alkylene or hydroxyalkylene radical comprising from 1 to 4 carbon atoms and A$^-$ is any monovalent anion;
  acrylates or methacrylates of cyclic aminoalcohols, such as, for example, 2-piperidinoethanol and 2-(pyrrolidin-1-yl)ethanol.

The hydrophilic fluoropolymers according to the invention are prepared by polymerization in a precipitating medium in the absence of surfactant or of any other stabilizing agent.

The polymerization in a precipitating medium makes it possible to achieve, depending on the choice of the solvent, much lower molecular weights than in the case of the polymerization in aqueous solution. Thus, it is not necessary to resort to transfer agents, such as alkyl mercaptans, in order to regulate the length of the chains; this advantage can be turned to good account if products having low molecular weights, therefore products whose aqueous solutions have very little viscosity, are desired. The achievement of low molecular weights for the hydrophilic fluoropolymers makes it possible to prepare aqueous solutions of low viscosity; this point is important for the use of the polymers in multipurpose fire-fighting emulsifiers where, for operating reasons, low viscosities are preferably sought.

The polymerization reaction takes place in an organic solvent in which the monomers and the radical initiator are completely soluble and in which the polymer obtained is insoluble, so that it precipitates during its formation. The polymerization solvent preferably has a short hydrocarbonaceous chain, such as acetonitrile and lower alcohols. The choice of the polymerization solvent depends on the nature of the monomers (a), (b) and (c); it is essential, at the beginning of the reaction, for all the reactants to be completely soluble in the solvent at a temperature corresponding to that of the beginning of the polymerization. The total concentration of monomers in the solvent is advantageously between 100 and 500 g/liter, preferably between 150 and 350 g/liter. The solvent is preferably chosen from lower alcohols comprising from 1 to 4 carbon atoms, such as, for example, methanol, ethanol, isopropanol or tert-butanol. The reaction can be carried out batchwise or continuously, it being possible for the monomers (a), (b) and (c) to be introduced independently into the reactor at different times.

The radical initiator can be an initiator of azo type, such as, for example, azobisisobutyronitrile or 4,4'-azobis (cyanopentanoic acid), and their derivatives possessing a hydrocarbonaceous or perfluoroalkyl side chain. The preparation of azo initiators possessing a perfluoroalkyl chain is described in reference [13].

The initiator can also be of peroxide type, such as, for example, dicyclohexyl peroxydicarbonate, benzoyl peroxide or di-tert-butyl peroxide. It can also be a perester possessing a hydrocarbonaceous or perfluoroalkyl side chain. The preparation and the use of perfluoroalkyl perester initiators is described in references [14] and [15].

The concentration of the initiator can vary from 0.1 to 10 mol % with respect to the total number of moles of monomers but more particularly between 0.6 and 2%. Depending on the type of radical initiator used and on the boiling point of the solvent, the polymerization temperature is between 50 and 100° C., preferably between 70 and 90° C. The reaction can be carried out, for example, at reflux of the solvent; in this case, the condenser condenses and returns the solvent in the liquid form to the reaction medium. The addition of the radical initiator can be carried out in a single step at the beginning of the reaction but it is preferable to add it in several fractions or else continuously as this makes possible better incorporation of the fluoromonomer in the polymer. It is preferable to employ the radical initiator already in solution and to use, in this case, the reaction solvent.

At the end of the reaction, the hydrophilic fluoropolymer according to the invention can be recovered in the solid form by filtration. The reaction solvent can also be removed from the reaction medium by evaporation and replaced with water, so as to obtain the polymer according to the invention in the form of an aqueous solution.

The hydrophilic fluoropolymers according to the invention lower the surface tension of aqueous solutions; they have a good foaming power and can, for example, be used as additives in multipurpose fire-fighting emulsifiers, that is to say fire-fighting emulsifiers intended for combating hydrocarbon fires, such as fires in which the hydrocarbons are petrols, oils, diesel oil, fuel oil, heptane, hexane or cyclohexane, or polar liquid fires, such as fires in which the polar liquids are alcohols (for example, methanol, ethanol and isopropanol), ketones (for example, dimethyl ketone and methyl isobutyl ketone), esters (for example, n-butyl acetate) and ethers (for example, methyl tert-butyl ether).

Fire-fighting emulsifiers are liquid compositions intended for combating combustible liquid fires (in which the combustible liquids are hydrocarbons and/or polar liquids). At the time of use, the emulsifiers are diluted in municipal water or seawater, generally at a concentration by volume of 3% (that is to say, 3 volumes of emulsifier per 97 volumes of water) or 6% (6 volumes of emulsifier per 94 volumes of water) but also, and more rarely 1% (1 volume of emulsifier per 99 volumes of water). After diluting the emulsifiers, as the amount of active materials necessary to satisfy the minimum extinguishing performance required is identical in all cases of dilution, emulsifiers which are dilutable to 3% are therefore twice as concentrated as those which are dilutable to 6%; they make it possible for the users to store smaller amounts of emulsifier, to save space and to reduce their storage costs. The foaming solution is obtained by diluting the emulsifier with water. This foaming solution passes through a fire hose nozzle where mechanical agitation takes place with incorporation of air, which generates an extinguishing foam used to combat combustible liquid fires.

When the polymers according to the invention are incorporated in the emulsifiers, they improve the stability of the extinguishing foams on a polar liquid and thus their extinguishing performance on fires of this type. Their content in the emulsifiers can generally range from 0.1 to 10% by weight and preferably from 0.2 to 5% by weight.

The emulsifiers in which the hydrophilic fluoropolymers can be incorporated are of two types, depending upon the origin of their foaming base. Synthetic emulsifiers, the foaming base of which is composed of at least one hydrocarbonaceous surface-active agent, and protein emulsifiers, the foaming base of which is composed of an animal protein hydrolysate, are distinguished. These two types of emulsifiers can comprise, according to their destination, one or more fluorosurfactants, one or more foam-stabilizing cosolvents, a hydrophilic polymer of high molecular weight of the polysaccharide type with a thixotropic and alcohol-repellent nature, an antifreezing agent, a corrosion-inhibiting agent, a preservative, a pH stabilizer or inorganic salts in which the cation is divalent, such as, for example, the magnesium ion or the calcium ion.

Multipurpose fire-fighting emulsifiers comprising a hydrophilic polymer according to the invention are used for combating hydrocarbon fires and polar liquid fires. Their performances can be evaluated by means of the following tests:

Extinguishing Efficiency on a Polar Liquid 150 ml of acetone are poured into a circular metal container with an internal diameter of 12 cm. Moreover, an aqueous solution composed of the emulsifier diluted to 3 or 6% in municipal water is prepared. There is available a rotary stirrer composed of a motor and a metal rod, at the end of which are attached paddles which produce a mechanical effect when the rod is being rotated; the rotational speed is adjustable from 0 to 2800 rev/min. The rod is introduced into the bottom of a cylindrical container equipped with an inlet orifice situated at the bottom and with an outlet orifice situated at the top. A metering pump transfers, via the inlet orifice, the aqueous solution to the bottom of the cylindrical container; foam is produced on contact with the rotating paddles, which foam is discharged as it is formed, via the outlet orifice. The throughput of the pump and the rotational speed of the rod are adjusted so that foam is continuously produced with a stationary foam throughput equal to 36±2 g/min (unless otherwise indicated).

When the foam throughput is stabilized, the acetone is ignited. After the acetone has burnt for 90 seconds, the foam is poured into the metal container via a single point situated on the circumference. When the acetone has been completely extinguished, the extinguishing time is recorded. The amount of foam poured in order to extinguish the fire seat is calculated by multiplying the time by the throughput. The emulsifiers with the best performance on a polar liquid are those for which the amount of foam poured is as low as possible.

Resistance of the Foam to Reignition

This parameter can be evaluated if the extinguishing time is less than 120 s. In this case, the foam is poured over the acetone even after the fire seat has been extinguished. The operation in which foam is run in lasts a total of 120 s. 60 s after the pouring of the foam has been halted, the contents of a reignition vessel (metal container with a diameter of 55 mm and a height of 40 mm filled with acetone to a height of 20 mm) are ignited. The reignition vessel is placed at the centre of the metal container described above, the surface of the fuel present in the said container being kept covered with foam. The time at the end of which the flames destroy the foam and spread in a lasting fashion over the surface of the metal container is recorded. The greater this time, the better the ability of the foam to prevent the resurgence of the fire.

EXAMPLES

In the following examples, which illustrate he invention without limiting it, the percentages shown are expressed by weight and some constituents used are denoted for simplicity by the following abbreviations:

A1=2-(perfluorooctyl)ethyl acrylate of formula:

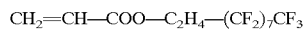
$$CH_2=CH-COO-C_2H_4-(CF_2)_7CF_3$$

A2=mixture of 2-(perfluoroalkyl)ethyl acrylates of formula:

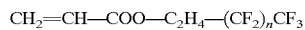
$$CH_2=CH-COO-C_2H_4-(CF_2)_nCF_3$$

having the following composition by weight:

| N | % |
|---|---|
| 5 | 1 |
| 7 | 63 |
| 9 | 25 |
| 11 | 9 |
| 13 | 3 |

A3=mixture of 2-(perfluoroalkyl)ethyl methacrylates of formula:

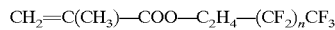
$$CH_2=C(CH_3)-COO-C_2H_4-(CF_2)_nCF_3$$

having the same composition by weight as A2

B1=acrylic acid of formula:

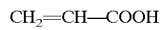
$$CH_2=CH-COOH$$

B2=N-[2-(acryloyloxy)ethyl]-N,N,N-trimethylammonium chloride of formula:

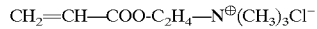
$$CH_2=CH-COO-C_2H_4-N^{\oplus}(CH_3)_3Cl^-$$

B3=2-acrylamido-2-methylpropanesulphonic acid of formula:

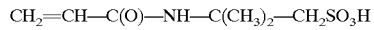
$$CH_2=CH-C(O)-NH-C(CH_3)_2-CH_2SO_3H$$

C1=27% aqueous/alcoholic solution of the fluorobetaine of formula:

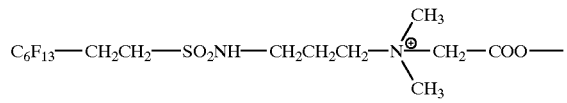

Examples 1 and 2 a) Synthesis 225 ml of isopropanol are incorporated in a 1 liter reactor equipped with a thermometer, a reflux condenser, a nitrogen inlet and a mechanical stirrer. Stirring is begun and then the reaction medium is brought to a temperature of 80° C. under a nitrogen flow. Furthermore, the solutions S1 and S2, which appear in the following table, are prepared.

|  |  | Example 1 | Example 2 |
|---|---|---|---|
| Solution S1 | Acrylamide | 27 g (0.38 mol) | 27 g (0.38 mol) |
|  | B1 | 7.4 g (0.10 mol) | 7.4 g (0.10 mol) |
|  | A3 | 20 g (0.03 mol) | 30 g (0.05 mol) |
|  | Isopropanol | 195 g (250 ml) | 195 g (250 ml) |
| Solution S2 | Azobisiso-butyronitrile | 2.5 g (0.015 mol) | 2.5 g (0.015 mol) |
|  | N-methyl-pyrrolidone | 25 g | 25 g |
|  | Isopropanol | 19.5 g (25 ml) | 19.5 g (25 ml) |

S1 and S2 are introduced simultaneously into the reactor over a time of 3 h, followed for 30 minutes by the introduction of the solution S2 alone.

After washing the polymer thus obtained with isopropanol and with acetone, the latter is dried for 14 h at 40° C. and then dissolved in a 70/30% by weight water/1,2-propanediol mixture. The dispersion obtained comprises 30% of water-soluble polymer. The pH of this dispersion is adjusted to 7.5 using diethanolamine.

b) Evaluation as Synthetic Fire-fighting Emulsifier

A series of synthetic fire-fighting emulsifiers is prepared by proceeding, for each of them, in the following way:

A mass of water-soluble polymer solution corresponding to 0.76 g of the hydrophilic fluoropolymer prepared above, 15 g of butyl diglycol and 5 g of solution C1 are added to 50 g of a 1% aqueous polysaccharide solution prepared by addition to water at room temperature with vigorous stirring of the polysaccharide Actigum CX9YL1 from System Bio-Industries in the powder form. The emulsifier is then made up to 100 g by addition of water. A fire-fighting emulsifier is obtained which is diluted to 3% with municipal water. The resulting solution, subjected to the tests described above, exhibits the characteristics given in the following table:

|  | Extinguishing efficiency on acetone | | |
|---|---|---|---|
| Polymer of Example | Extinguishing time[a] | Mass of foam poured | Reignition time |
| 1 | 89 s | 59 g | 153 s |
| 2 | 82 s | 55 g | 187 s |

[a]For the test of extinguishing efficiency on acetone, throughput of the foam set at 40 g/min.

Example 3 a) Synthesis

Example 1 is repeated while replacing B1 with 21.27 g of B3.

b) Evaluation as Synthetic Fire-fighting Emulsifier

The evaluation is carried out as in Example 1. The results of the tests are as follows:

Extinguishing time: 92 s (foam throughput 40 g/min)

Mass of foam poured: 61 g

Reignition time: 168 s

Examples 4 and 5 a) Synthesis

The synthesis is carried out as in Example 1 but the compositions of the solutions are given in the following table:

|  |  | Example 4 | Example 5 |
|---|---|---|---|
| Solution S1 | Acrylamide | 27 g (0.38 mol) | 29.2 g (0.41 mol) |
|  | B1 | 5.2 g (0.07 mol) | 5.2 g (0.07 mol) |
|  | B2 | 6 g (0.03 mol) | 0 |
|  | A3 | 30 g (0.05 mol) | 30 g (0.05 mol) |
|  | Isopropanol | 195 g (250 ml) | 195 g (250 ml) |
| Solution S2 | Azobisiso-butyronitrile | 2.5 g (0.015 mol) | 2.5 g (0.015 mol) |
|  | N-methyl-pyrrolidone | 25 g | 25 g |
|  | Isopropanol | 16.5 g (25 ml) | 16.5 g (25 ml) | b) Evaluation as Synthetic Fire-fighting Emulsifier

Two synthetic fire-fighting emulsifiers are prepared by proceeding as for Example 1. The results of the tests are collated in the following table:

|  | Extinguishing efficiency on acetone | | |
|---|---|---|---|
| Polymer of Example | Extinguishing time[a] | Mass of foam poured | Reignition time |
| 4 | 57 s | 38 g | 198 s |
| 5 | 76 s | 52 g | 190 s |

[a]For the test of extinguishing efficiency on acetone, throughput of the foam set at 40 g/min.

Examples 6 and 7 a) Synthesis

The synthesis is carried out as in Example 1 but the compositions of the solutions are given in the following table:

|  |  | Example 6 | Example 7 |
|---|---|---|---|
| Solution S1 | Acrylamide | 27 g (0.38 mol) | 29.2 g (0.41 mol) |
|  | B1 | 5.2 g (0.07 mol) | 5.2 g (0.07 mol) |
|  | B2 | 6 g (0.03 mol) | 6 g (0.03 mol) |
|  | A2 | 29.3 g (0.05 mol) | 29.3 g (0.05 mol) |
|  | Solvent: | Isopropanol 195 g (250 ml) | t-butanol 196 g (250 ml) |
| Solution S2 | Azobisiso-butyronitrile | 2.5 g (0.015 mol) | 2.5 g (0.015 mol) |
|  | N-methyl-pyrrolidone | 25 g | 25 g |
|  | Solvent: | Isopropanol 19.5 g (25 ml) | t-butanol 19.5 g (25 ml) |

In the case of Example 7, t-butanol is used instead of the 225 ml of isopropanol mentioned in Example 1.

b) Evaluation as Synthetic Fire-fighting Emulsifier

By proceeding as in Example 1, the following results are obtained:

|  | Extinguishing efficiency on acetone | | |
|---|---|---|---|
| Polymer of Example | Extinguishing time[a] | Mass of foam poured | Reignition time |
| 6 | 72 s | 48 g | 182 s |
| 7 | 150 s | 100 g | — |

[a]For the test of extinguishing efficiency on acetone, throughput of the foam set at 40 g/min.

Example 8 a) Synthesis 600 ml of isopropanol are incorporated in a 5 liter reactor equipped with thermometer, a nitrogen inlet, a mechanical stirrer and a Dean and Stark trap filled with isopropanol surmounted by a reflux condenser. Stirring is begun and then the reaction medium is brought to a temperature of 80° C. under a nitrogen flow.

Furthermore, the following solutions are prepared:

Solution S1:
- 158.32 g (2.22 mol) of acrylamide
- 30.36 g (0.42 mol) of B1
- 35 g (0.18 mol) of B2
- 175.20 g (0.30 mol) of A3
- 847.8 g (1080 ml) of isopropanol Solution S2:
- 29.4 g of azobisisobutyronitrile
- 400 ml of a 50/50 isopropanol/N-methylpyrrolidone mixture.

The solution S1 and 200 ml of the solution S2 are run in over 3 h. The reaction medium is subsequently kept stirred under nitrogen at the reflux temperature of the isopropanol for 2 h.

620 ml of isopropanol are distilled off. 600 ml of distilled water are heated to 70° C. The first 400 ml are added in 80 ml portions. A total of 730 ml of azeotrope is removed from the reactor. 250 g of 1,2-propanediol are added to the reaction medium. The solids content of the dispersion is adjusted to 31.5% by addition of water and the pH to 6.7 by addition of diethanolamine.

b) Evaluation as Synthetic Fire-fighting Emulsifier

By proceeding as in Example 1, the following results are obtained:

Extinguishing time: 63 s (foam throughput 40 g/min)

Mass of foam poured: 42 g

Reignition time: 180 s

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

REFERENCES

[1] A. Hill, F. Candau and J. Selb—Macromolecules (1993), 26, p. 4521.

[2] C. L. McCormick, T. Nonaka and C. B. Johnson—Polymer (1988), 29, p. 731.

[3] K. C. Dowling and J. K. Thomas—Macromolecules (1990), 23, p. 1059.

[4] Y. X. Zhang, A. H. Da, T. E. Hogen-Esch and G. B. Butler—ACS—Symp. Ser. (1991), 467, p. 159.

[5] Y. X. Zhang, A. H. Da, T. E. Hogen-Esch—Journal of Polymer Science; Part C: Polymer Letters (1990), Vol. 28, p. 213.

[6] F. S. Hwang and T. E. Hogen-Esch—Polymer Preprints (1993), 34(1), p. 405.

[7] T. E. Hogen-Esch, M. Yassini, Y.-X. Zhang, F. Huang, E. J. Amis and T. Seery—Polymer Preprints (1990), 31 (2), p. 460.

[8] Y. X. Zhang, A. H. Da, T. E. Hogen-Esch and G. B. Butler—Journal of Polymer Science; Part A: Polymer Chemistry (1992), Vol. 30, p. 1383.

[9] X. Xie and T. E. Hogen-Esch—Macromolecules (1996), 29, p. 1734.

[10] M. Yassini and T. E. Hogen-Esch—Polymer Preprints (1994), 35 (1), p. 478.

[11] Y. X. Zhang, A. H. Da and T. E. Hogen-Esch—Polymer Preprints (1989), 30 (2), p. 338.

[12] F. A. Abdel-Mohdy, A. Waly, A. Higazy and A. Hebeish—Pigment & Resin Technology (1994), 23 (2), p. 10.

[13] J. M. Bessiere, B. Boutevin, O. Loubet—Polymer Bulletin (1993), 30, p. 545.

[14] H. Sawada—Review on Heteroatom Chemistry (1993), 8, p. 205.

[15] H. Sawada, Y. Minoshima, T. Hiromitsu—Journal of Fluorine Chemistry (1993), 65 (1–2), p. 169.

What is claimed is:

1. Hydrophilic fluoropolymers obtained by radical polymerization, in a precipitating medium, of a mixture of monomers comprised, by weight, of:

(a) 25 to 49% of at least one nonionic hydrophilic monomer selected from the group consisting of N-vinyl-2-pyrrolidone, derivative of N-vinyl-2-pyrrolidone, acrylamide, methacrylamide, and an N-substituted compound having the formula of $CH_2=CR^1-CONR^2R^3$ wherein $R^1$ represents a hydrogen atom or a methyl radical; and $R^2$ and $R^3$ are each independently a hydrogen atom or an alkyl or hydroxyalkyl radical comprising from 1 to 3 carbon atoms;

(b) 20 to 75% of at least one monomer comprising a perfluoroalkyl radical; and (c) 5 to 75% of one or more ionic or ionizable hydrophilic monomers.

2. Hydrophilic fluoropolymer according to claim 1, wherein the fluoromonomer or fluoromononers (b) are acrylic or methacrylic monomers corresponding to the following formula:

(III)

in which $R_f$ represents a linear or branched perfluoroalkyl radical comprising from 2 to 20 carbon atoms, B represents a divalent linkage bonded to O via a carbon atom which optionally comprises at least one oxygen, sulphur and/or nitrogen atom and $R^4$ represents a hydrogen atom or a methyl radical.

3. Hydrophilic fluoropolymer according to claim 2, wherein B is a divalent radical $CH_2CH_2$ or $CH_2CH_2NR^5SO_2CH_2CH_2$ in which $R^5$ represents a hydrogen atom or a methyl or ethyl radical.

4. Hydrophilic fluoropolymer according to claim 1, wherein the ionic or ionizable hydrophilic monomer or monomers are selected from:

acrylic acid, methacrylic acid and their aklali metal or quaternary ammonium ions salts;

monoolefinic sulphonic acid compounds and their alkali metal salts, including sodium ethylenesulphonate, sodium styrenesulphonate and 2-acrylamido-2-methylpropanesulphonic acid;

acrylates or methacrylates of the aminoalcohols corresponding to the following formulae:

in which the $R^6$, $R^7$ and $R^8$ symbols, which are identical or different, each represent an alkyl or hydroxyalkyl radical comprising 1 to 4 carbon atoms, Y represents an alkylene or hydroxyalkylene radical comprising from 1 to 4 carbon atoms and $A^-$ is any monovalent anion.

5. Hydrophilic fluoropolymer according to claim 1, prepared by radical polymerization in a precipitating medium in acetonitrile or in an alcohol comprising from 1 to 4 carbon atoms.

6. Hydrophilic fluoropolymer according to claim 5, prepared by radical polymerization in a precipitating medium in ethanol, t-butanol or isopropanol.

7. Hydrophilic fluoropolymer according to claim 1, in dispersion in water or in a water/cosolvent mixture.

8. Method for extinguishing fires comprising applying the hydrophilic fluoropolymer according to claim 1.

9. Multipurpose fire-fighting emulsifier comprising, by weight, from 0.1 to 10% of a hydrophilic fluoropolymer according to claim 1.

10. Hydrophilic fuoropolymer according to claim 1, wherein the amount of nonionic hydrophilic monomer (a) is 25 to 45%, of the at least one monomer (b) is 25 to 60%, and of hydrophilic monomers (c) is 5 to 35%.

11. Hydrophilic fluoropolymer according to claim 1, wherein the amount of nonionic hydrophilic monomer (a) is 35 to 45%, of the at least one monomer (b) is 25 to 50%, and of hydrophilic monomers (c) is 5 to 20%.

12. Hydrophilic fluoropolymer according to claim 2, wherein $R_f$ has from 4 to 6 carbon atoms.

13. Multi purpose fire-fighting emulsifier according to claim 9, wherein the amount of emulsifier is from 0.2 to 5%.

\* \* \* \* \*